(12) United States Patent
Kaarela et al.

(10) Patent No.: US 10,572,113 B2
(45) Date of Patent: *Feb. 25, 2020

(54) APPARATUS FOR NOTIFICATION OF INCOMING COMMUNICATION

(71) Applicant: Microsoft Technology Licensing, LLC, Redmond, WA (US)

(72) Inventors: Kari Kaarela, Oulu (FI); Elina Kaarela, Oulu (FI); Kirmo Koistinen, Oulu (FI); Timo Tervo, Oulu (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/852,149

(22) Filed: Dec. 22, 2017

(65) Prior Publication Data

US 2018/0121046 A1    May 3, 2018

Related U.S. Application Data

(63) Continuation of application No. 13/936,422, filed on Jul. 8, 2013, now Pat. No. 9,898,166, which is a continuation of application No. 11/397,841, filed on Apr. 4, 2006, now Pat. No. 8,489,748.

(51) Int. Cl.
*H04L 12/28* (2006.01)
*G06F 3/0484* (2013.01)

(52) U.S. Cl.
CPC .......... *G06F 3/0484* (2013.01); *H04L 12/282* (2013.01); *H04L 12/283* (2013.01); *H04L 12/2838* (2013.01); *H04L 12/2803* (2013.01); *H04L 12/2809* (2013.01); *H04L 2012/2849* (2013.01)

(58) Field of Classification Search
CPC ............ H04L 12/2803; H04L 12/2809; H04L 12/283
See application file for complete search history.

(56) References Cited

U.S. PATENT DOCUMENTS

| 6,681,396 | B1 | 1/2004 | Bates et al. |
|---|---|---|---|
| 6,725,281 | B1 | 4/2004 | Zintel et al. |
| 7,647,394 | B2 | 1/2010 | Rao et al. |
| 8,489,748 | B2 * | 7/2013 | Kaarela ................. H04L 12/282 709/227 |

(Continued)

OTHER PUBLICATIONS

"Final Office Action Issued in U.S. Appl. No. 11/397,841", dated Apr. 27, 2009, 9 Pages.

(Continued)

*Primary Examiner* — Jeong S Park
(74) *Attorney, Agent, or Firm* — Ray Quinney & Nebeker, P.C.; Thomas M. Hardman; Matthew M. Walker

(57) ABSTRACT

A system for providing various overlay information one UPnP AV media renderers. According to the present invention, indications of messages and/or other information received by a UPnP mobile telephone or other UPnP control point can be directly transmitted to a renderer and exhibited in different manners. The present invention also permits the UPnP control point to transmit an event subscription to me renderer for subsequent use. The renderer permits accept or reject the receipt of various information at the particular time.

20 Claims, 5 Drawing Sheets

(56) References Cited

U.S. PATENT DOCUMENTS

| | | | |
|---|---|---|---|
| 8,509,817 B2* | 8/2013 | Kaarela | H04L 12/2827 |
| | | | 455/456.4 |
| 9,898,166 B2* | 2/2018 | Kaarela | H04L 12/282 |
| 2002/0174430 A1 | 11/2002 | Ellis et al. | |
| 2003/0126239 A1* | 7/2003 | Hwang | H04L 12/2803 |
| | | | 709/220 |
| 2003/0227875 A1* | 12/2003 | Wei | H04L 1/1812 |
| | | | 370/252 |
| 2004/0117843 A1 | 6/2004 | Karaoguz et al. | |
| 2004/0187164 A1 | 9/2004 | Kandasamy et al. | |
| 2005/0138193 A1 | 6/2005 | Encarnacion et al. | |
| 2005/0146598 A1 | 7/2005 | Abiezzi et al. | |
| 2005/0149215 A1 | 7/2005 | Deshpande | |
| 2005/0277431 A1 | 12/2005 | White | |
| 2006/0010476 A1 | 1/2006 | Kelly et al. | |
| 2006/0031459 A1 | 2/2006 | Ahn et al. | |
| 2006/0094360 A1* | 5/2006 | Jung | H04L 12/2805 |
| | | | 455/41.2 |
| 2006/0153072 A1 | 7/2006 | Bushmitch et al. | |
| 2006/0209810 A1 | 9/2006 | Krzyzanowski et al. | |
| 2007/0091206 A1 | 4/2007 | Bloebaum | |
| 2007/0180485 A1 | 8/2007 | Dua | |
| 2007/0200920 A1* | 8/2007 | Walker | H04N 7/148 |
| | | | 348/14.08 |
| 2007/0210908 A1* | 9/2007 | Putterman | G08B 27/008 |
| | | | 340/506 |
| 2007/0226311 A1* | 9/2007 | Kaarela | H04L 12/2827 |
| | | | 709/217 |
| 2007/0233878 A1 | 10/2007 | Kaarela et al. | |

OTHER PUBLICATIONS

"Final Office Action Issued in U.S. Appl. No. 11/397,841", dated Jul. 10, 2012, 12 Pages.

"Non Final Office Action Issued in U.S. Appl. No. 11/397,841", dated Feb. 9, 2011, 13 Pages.

"Non Final Office Action Issued in U.S. Appl. No. 11/397,841", dated Dec. 15, 2011, 12 Pages.

"Non Final Office Action Issued in U.S. Appl. No. 11/397,841", dated Nov. 16, 2009, 9 Pages.

"Non Final Office Action Issued in U.S. Appl. No. 11/397,841", dated Sep. 17, 2008, 9 Pages.

"Non Final Office Action Issued in U.S. Appl. No. 11/397,841", dated Jul. 1, 2010, 12 Pages.

"Final Office Action Issued in U.S. Appl. No. 13/936,422", dated Sep. 16, 2016, 16 Pages.

"Final Office Action Issued in U.S. Appl. No. 13/936,422", dated Jul. 11, 2017, 10 Pages.

"Non Final Office Action Issued in U.S. Appl. No. 13/936,422", dated Feb. 8, 2017, 15 Pages.

"Non Final Office Action Issued in U.S. Appl. No. 13/936,422", dated Mar. 21, 2016, 18 Pages.

Miller, et al., "Home Networking with Universal Plug and Play", In IEEE Communications Magazine, vol. 39, Issue 12, Dec. 2001, pp. 104-109.

* cited by examiner

APPARATUS FOR NOTIFICATION OF INCOMING COMMUNICATION

This application is a continuation of and claims priority from U.S. patent application Ser. No. 13/936,424 filed on Jul. 8, 2013, which is a continuation of and claims priority from U.S. patent application Ser. No. 11/397,841, filed on Apr. 4, 2006 and issued as U.S. Pat. No. 8,489,748, all of which are hereby incorporated in their entirety by reference.

FIELD OF THE INVENTION

The present invention relates generally to Universal Plug and Play (UPnP) technology. More particularly, the present invention relates to the use of overlay user interfaces (UIs) in a UPnP audio/video (AV) renderer.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

UPnP technology defines an architecture for pervasive peer-to-peer network connectivity of intelligent appliances, wireless devices, and personal computers of all form factors. UPnP is designed to bring easy-to-use, flexible, standards-baud connectivity to ad-hoc or unmanaged networks whether in the home, in a small business, public spaces, or attached to the Internet. UPnP technology provides a distributed, open networking architecture that leverages TCP/IP and Web technologies to enable seamless proximity networking, in addition to control and data transfer among networked devices.

The UPnP Device Architecture (UDA) is designed to support zero-configuration, "invisible" networking and automatic discovery for a breadth of de ice categories from a wide range of vendors. In other words, the UDA enables a device to dynamically join a network, obtain an IP address, convey its capabilities, and learn about the presence and capabilities of other devices.

In a UPnP network, such as a network established in a person's home, a wide variety of different devices can freely interact with each other. For example, a user may be able to play music or video stored on a computer or mobile device on a stereo or television system. A user could use his or her mobile telephone to program different devices, and a plethora of other functions could also be implemented among multiple devices.

In the UPnP environment, at least one device serves as a control point, through which various actions can be implemented. For example and in the context of a mobile telephone, a user could have images or video stored on his or her phone displayed on a television, could have audio played on a stereo, or could perform myriad of other actions involving other rendering devices. Although the use of such mobile devices in a UPnP network has many advantages, the use of a mobile telephone or similar mobile device in the digital home, for example when acting as a UPnP/Digital Living Network Alliance (DLNA) control point poses some problems. For example, if a user is watching a movie or television program, it can be difficult or even impossible to hear his or her mobile telephone when it is ringing. Likewise, if a user is watching a program, he or she is not likely to notice an indication of an incoming email or short message service (SMS) message.

Another problematic situation can arise in connection with "home automation" systems, such as alarm system, a heating system, or a cooling system. Some such systems, when UPnP-enabled, can transmit messages to other UPnP devices when certain actions occur, such as a heating unit not functioning properly or an alarm fault being detected. However, if such messages are programmed to be transmitted to a mobile telephone, and W the user is watching a television program when a message is transmitted, he or she may not become aware of the message until a much later time.

It would therefore be desirable to develop a system that would help to address the above-identified shortcomings.

SUMMARY OF THE INVENTION

The present invention comprises a system and method for providing various overlay features for use in a UPnP AV media renderer. According to the present invention, indications of messages and/or other information received by a UPnP mobile telephone or other UPnP control point can be directly transmitted to a renderer and exhibited in different manners. For example, information can be overlayed directly over the content being exhibited, it can be shown in a "picture in picture" format, or it can be exhibited in a "news ticker" fashion. The present invention also permits the UPnP control point to transmit an event subscription to the renderer for subsequent use. Additionally, and in various embodiments of the present invention, the renderer permits the user to accept or reject the receipt of various information at the particular time.

The present invention provides a number of advantages and benefits to a user that have not previously been available in the UPnP environment. The present invention improves the usability of a mobile device both as a UPnP control point and as part of the home network. The present invention also improves both the usability and interoperability of other UPnP devices within the UPnP network. The present invention can be implemented in a wide variety of UPnP devices and is particularly beneficial for mobile devices such as mobile telephones.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention comprises a system far providing various overlay features for use in a UPnP AV media renderer. According to the present invention, indications of messages and/or other information received by a UPnP mobile telephone or other UPnP control point can be directly transmitted to a renderer and exhibited in different manners. The present invention also permits the UPnP control point to transmit an event subscription to the renderer for subsequent use. Additionally, and in various embodiments of the present invention, the renderer permits the user to accept or reject the receipt of various information at the particular time.

Figure 1:
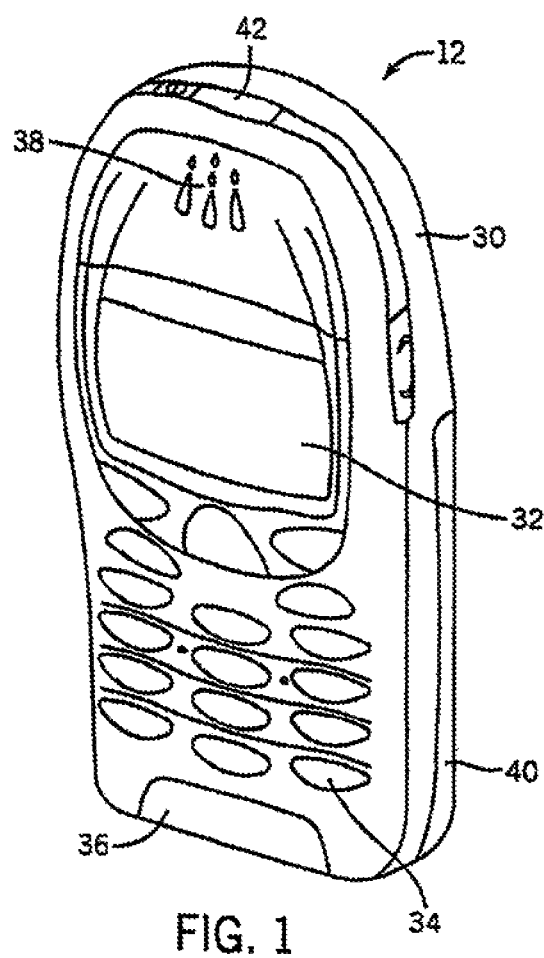
FIG. 1 is a perspective view of a UPnP mobile telephone that in the implementation of the present invention.
Figure 2:
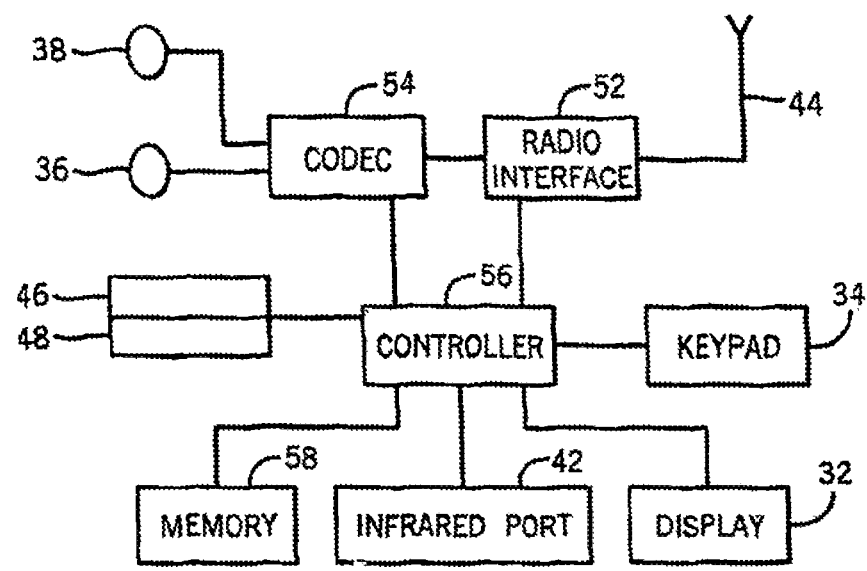
FIG. 2 is a schematic representation of the circuitry of the UPnP mobile telephone of FIG. 1.

FIGS. 1 and 2 show one representative UPnP control point device, in the form of a UPnP mobile telephone 12, within which the present invention may be implemented. It should be understood, however, that the present invention is not intended to be limited to one particular type of UPnP mobile telephone 12 or UPnP control point device. The features and circuitry depicted in FIGS. 1 and 2 can be incorporated into a wide variety of other UPnP devices. The UPnP mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52 codec circuitry 54, a controller 56 and a memory 58. Individual circuits and elements are all of a type well known in the art, for example in the Nokia range of mobile telephones. The features and circuitry depicted in FIGS. 1 and 2 can be incorporated into a wide variety of other UPnP devices.

Figure 3:
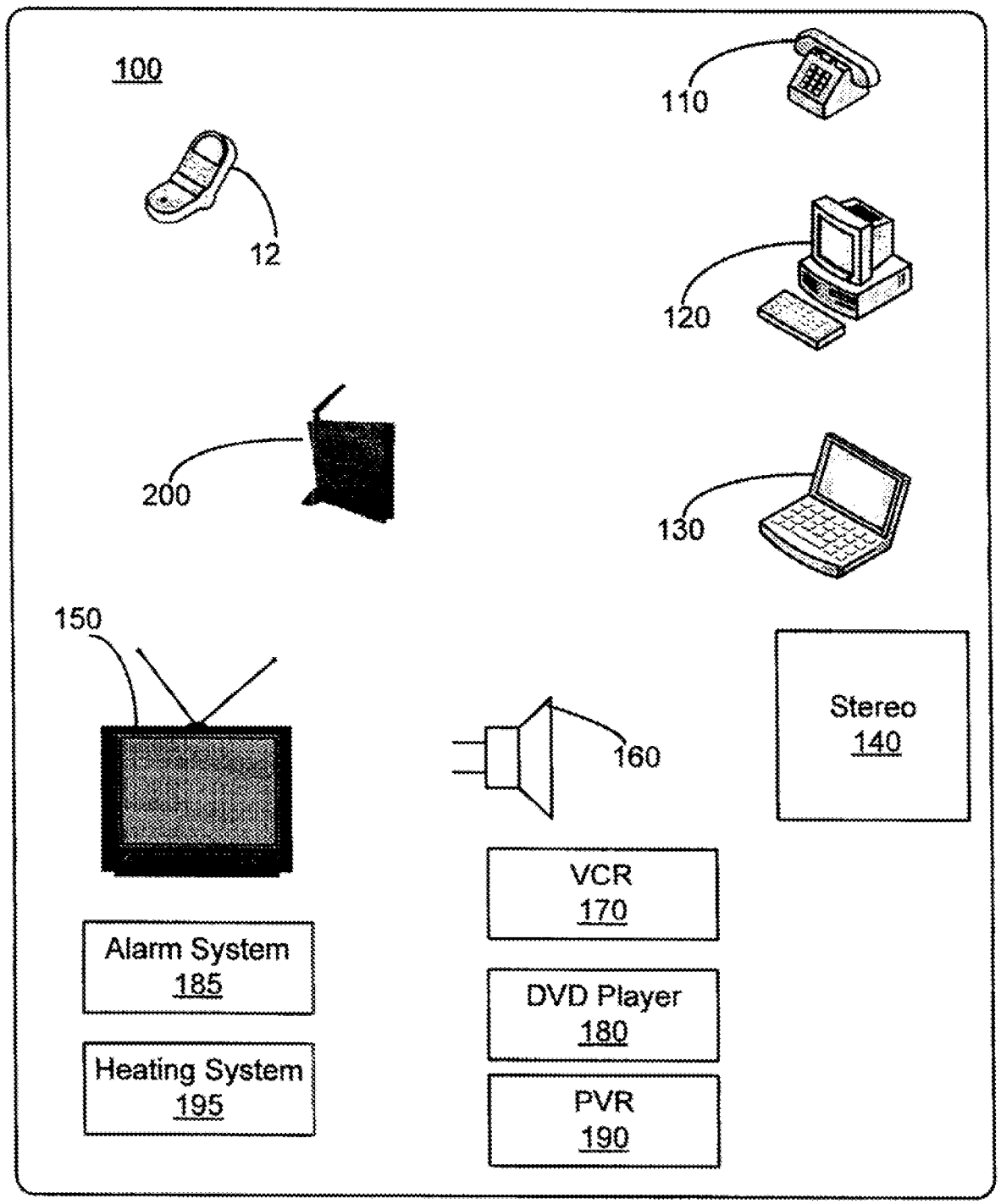
FIG. 3 is a representation of a local UPnP environment including a UPnP mobile telephone and a plurality of other UPnP devices.

FIG. 3 shows a representative UPnP environment 100 within which the present invention may be implemented. The UPnP environment 100 may comprise, for example, a person's living room, kitchen, home office, or other space. The UPnP environment can also be larger in size, including most or all of a user's home, for example, in addition to the UPnP mobile telephone 12, the UPnP environment 100 may include UPnP devices such as a land-line telephone 110, a desktop computer 120, a laptop computer 130, a stereo system 140, a television 150, a speaker system 160, a video cassette recorder (VCR) 170, a digital versatile disc (DVD) player 180, and a personal video recorder (PVR) 190. Other types of UPnP devices that can exist within the UPnP environment 100 include, for example, personal digital assistants (PDAs), a combination PDA and mobile telephone, and integrated messaging devices. A server 200 may be used, for example, to store items such as movies, music, television shows, games, and text-based files for use by UPnP devices within the UPnP environment 100. The UPnP environment 100 can also include several automated home systems, including an alarm system 185 and a heating system 195, for example.

The following are a number of different potential use cases for the present invention. It should be noted, however, that the following use cases are only examples and art not intended to comprise an exhaustive list of such scenarios. In one use case, a user receives a telephone call. This call can comprise virtually any format, including VoIP, etc. This call is received by the user's mobile telephone 12 while the user is watching television or listening to music on UPnP AV-enabled equipment. Alternatively, the user could receive a message in virtually any format, including SMS, multimedia message service (MMS), instant message (IM), e-mail, etc, while watching or listening to video or audio content. In these situations, the mobile telephone 12, acting as a UPnP control point, transmits a message such as "An incoming call from (phone number) or "You have a new message" to a currently-active media renderer or renderers for exhibition to the user. The message can be exhibited in a variety of forms. For example, the message can overlay the video content being shown, it can appear in its own separate picture (creating a picture-in-picture format on the screen), or it could appear as scrolling text along the bottom of the screen, in a "news ticker" form. The particular format used can be based upon user preferences, the capabilities of the renderer, or some other criteria.

In another use case, a user can request an event notification from his or her PVR 190 when the hard disk is becoming full. When the control point receives the event notification "PVR, disk full," it redirects the message to the currently-active media renderer or renderers such that a message is shown. As above, the message can be shown in overlay, PIP, news ticker, or some other format.

In yet another use case, a person's home includes UPnP devices other than standard AV devices. For example, a person's home can have UPnP-enabled home automation systems, security devices, etc. When one such device sends an event notification to a control point, such as a message that the heating system 195 is malfunctioning, the control point can redirect the message to the currently active media renderer or renderers. The control point can also store the messages in the phone for further reference.

For the implementation of the present invention, various embodiments involve the addition of a new "overlay message action" which should be recognizable for the UPnP AV media renderer at issue. This can be implemented through changes and/or additions to device and service description XML files that are used by the media renderer. Using this action, and having the message text, format, and other related information included as arguments, the control point can request that the renderer display the message as an overlay messages on its screen. In this arrangement, the control point must have the appropriate application logic to send the action requests. In other words, the control point must be capable of transmitting the appropriate messages to the media renderer. In one embodiment of the invention, the addition to the UPnP AV media renderer specification is, by default, backwards compatible with earlier versions, as a control point receives all of the required information about the media renderer's capabilities in the device & service descriptions and will not attempt to send such actions to a renderer that does not support them.

The implementation of the control point depends upon the use cases that are desired to be accomplished. If the use cases are limited to mobile phone use cases (incoming calls, messages, etc), then the implementation of that particular embodiment of the invention requires integration of the mobile phone's functionality (or the functionality of any portable UPnP control point with connectivity that can be used for making/receiving calls (e.g. VoIP) or receiving messages) and the UPnP AV control point running in the same device. An example implementation in a mobile phone 12 involves the use of the phone application program interface (API) to discover an incoming call or message, and then the use of the UPnP AV action to send the proper message to be displayed as an overlay message on the renderer's screen.

Figure 4:
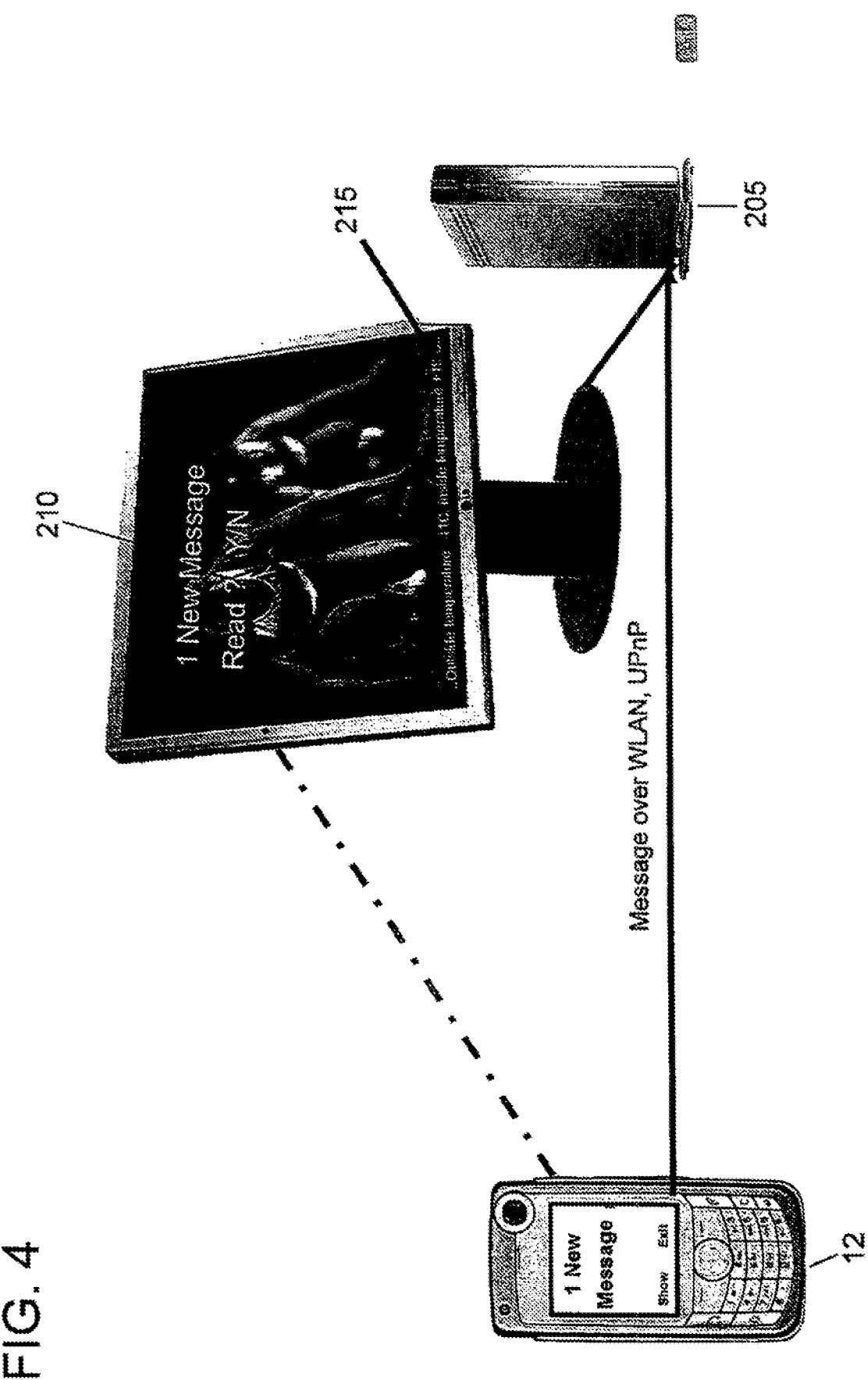
FIG. 4 is a representation showing how messages received by a UPnP mobile telephone within a UPnP network can cause various types of overlay messages to appear on a rendering device according to various embodiments of the present invention.

In one embodiment of the present invention, a "feedback" mechanism is included with the renderer device, allowing the user to control or manipulate the messages that are displayed. The feedback mechanism can involve, for example, a user interface and/or remote control mechanism. As in the case of incoming merges, a user may want to receive an indication of a new message to appear on his television screen but, for privacy reasons, he or she might not want the message itself to be read by others in the room at that time. Such a situation is represented in FIG. 4. In this figure, the control point (the mobile telephone 12) first transmits an indication of a new message with a question to the renderer 205. This message can transmitted by wireless LAN (WLAN), UPnP, etc. in this instance, the message states "A new message has arrived. Do you want to read it now? Y/N," In this instance, the indication is provided as an overlay message 210 on the renderer 205. However, the indication could also be provided as part of a news ticker 215. In addition, the control point also transmits an event subscription for the reply to the yes/no question. The renderer 205 permits the user to select "Y" or "N" and press "OK" triggering the event to be sent back to the control point.

If the user selects "N," then the message that has been received is stored for later use. If the user selects "Y," then the message is exhibited. This exhibition can take a variety of forms. For example, the message could be displayed on the mobile telephone 12, or it could be transmitted to the renderer 205 for exhibition. The manner of exhibition can be determined based upon predefined and/or adjustable user settings. In addition, it is also possible that a "Y" response results in other actions to occur at the renderer 205. For example, it is possible for a "Y" response to cause a video program to pause, for the sound to be lowered or muted, or for other actions to occur. These actions can occur based upon predefined and/or adjustable user settings.

In related embodiments of the invention, the user can use the feedback channel to acknowledge the event that led to a message being displayed. For example, in a situation where a warning is displayed that the heating system 195 appears to be malfunctioning, the user can use his or her remote control to "cancer' or otherwise acknowledge the message. Alternatively, devices other than the remote control can be used to acknowledge the message. Depending upon the respective capabilities, virtually any device within the UPnP network 100 can be used for this purpose. Additionally, it is possible that the entering of an acknowledgment can result in actions being implemented in other devices within the network, in a manner similar to that discussed above.

Figure 5:
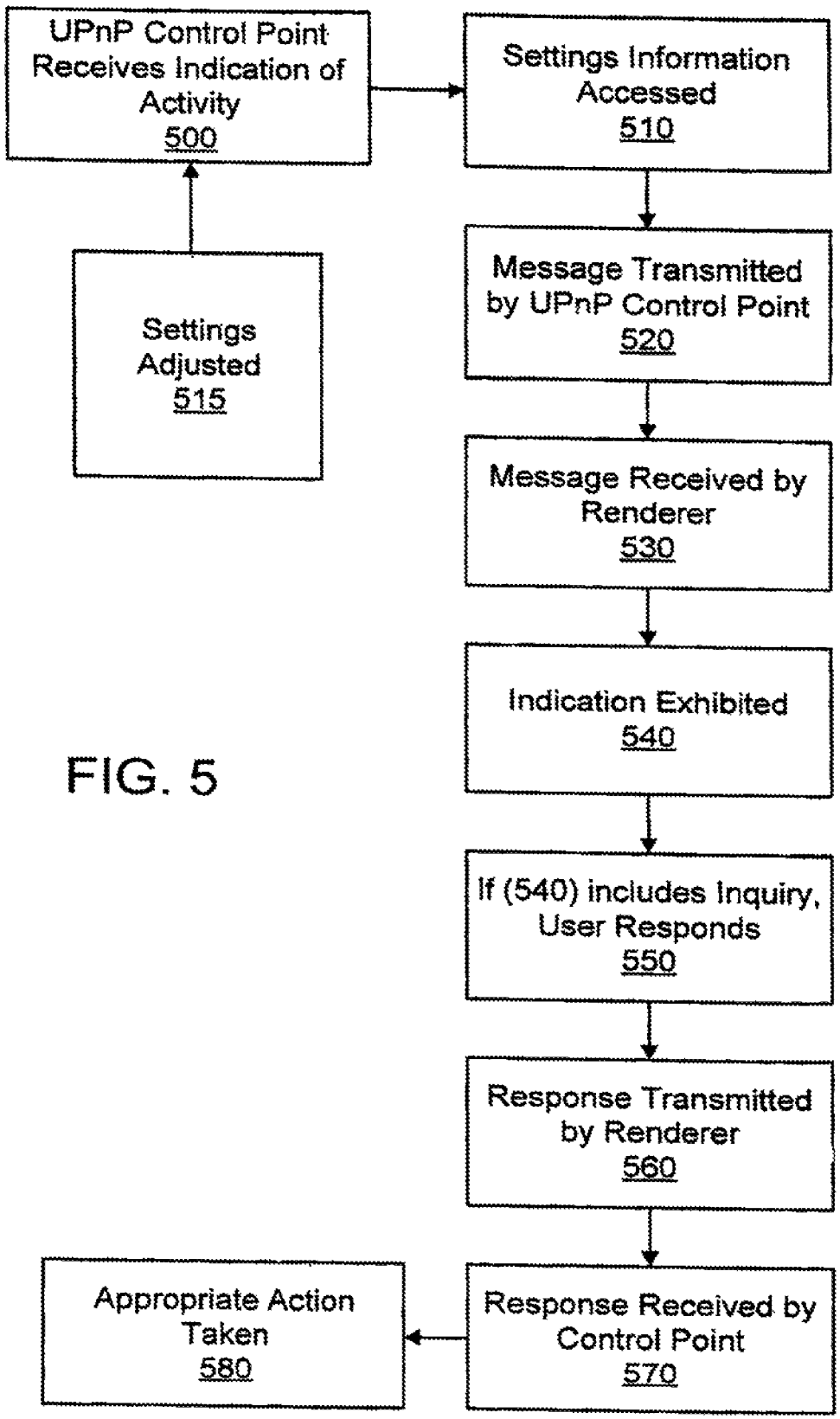
FIG. 5 is a flow showing the implementation of various embodiments of the present invention.

In another embodiment of the invention, several UPnP device categories (e.g. home automation/security and AV) can be involved, in such a case, the UPnP control point needs to be capable of supporting each of the UPnP device control protocols (DCPs) in question. Therefore, the UPnP control point should be capable of implementing several UPnP DCPs in various embodiments of the present invention, FIG. 5 is a flow chart showing the implementation of various features of the present invention. At 500 in FIG. 5, the UPnP control point device receives an indication of a particular action. As discussed above, this action may comprise, for example, a voice can, a text, multimedia or electronic message, a notice from the heating system 195 of a malfunction, etc. At 510 and in response to the receipt of this indication, the UPnP control point device accesses settings information to determine whether the indication should be transmitted to a renderer 205, to which renderer 205 or renderers 205 the indication should be transmitted, and how the renderer 205 should exhibit the indication. The various settings can be input and/or adjusted at 515. At 520, a message is transmitted to the desired renderers 205 regarding the indication and how it should be exhibited. Based on information collected by the UPnP control point device, the UPnP control point device knows which rendering devices are located within the UPnP environment 100, which such devices are activated, etc. Therefore, the message that is transmitted can be specifically targeted to one or more rendering devices, although it is also possible to use multicast or broadcast messages if so desired. At 530, the message is received by the appropriate renderer(s) 205, and the indication is displayed or otherwise exhibited at 540 in accordance with the settings. In the event that a feedback mechanism is provided, and an inquiry is presented with the indication, then the user responds to the inquiry at 550. The user's answer is transmitted by the renderer 205 at 560 and is received at the control point at 570. Depending upon the user's provided answer, appropriate action is taken at 580. For example, if the user responds to "Do you want to accept the call" (when the mobile telephone 12 receives an incoming call) with "yes," then the renderer 205 would perform an action such as muting the sound, pausing a recorded program, etc., while the user answers the call on his mobile telephone 12.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (TDMA), Transmission Control Protocol/internet Protocol (TCP/IP), Short Messaging Service (SMS), Multimedia Messaging Service (MMS), e-mail, Instant Messaging Service (IMS), Bluetooth, IEEE 802.11, WLAN/VoIP, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc, that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A mobile device operable by a user to receive an incoming communication, the mobile device comprising:
   a processor; and
   a memory unit communicatively connected to the processor and including computer code that when executed controls the mobile device to:
   receive an indication of an incoming communication at the mobile device, wherein the indication includes an identifier indicating that the incoming communication is a selected type of a plurality of types of communications, the plurality of types of communications including a phone call and a text message;
   process the indication to determine that the incoming communication is a selected type of the plurality of types of communications;
   access setting information in response to the receipt of the indication of the incoming communications;
   determine that alert information regarding the incoming communication should be transmitted to a rendering device based on the setting information and the determination that the incoming communication is the selected type of the plurality of types of communications; and
   transmit the alert information regarding the incoming communication from the mobile device to the rendering device, the alert information including an instruction, based on the setting information, for the rendering device to exhibit a notification that notifies the user of the incoming communication and indicates that the incoming communication is of the selected type.

2. The mobile device of claim 1, wherein plurality of types of communications further comprises an incoming email.

3. The mobile device of claim 1, wherein the instruction directs the rendering device to overlay the notification over content being exhibited on the rendering device.

4. The mobile device of claim 1, wherein the notification includes a request for feedback from the user.

5. The mobile device of claim 4, wherein the code further controls the mobile device to:
   receive feedback that has been provided to the rendering device by the user in response to the request; and
   implement at least one action in response to the received feedback.

6. The mobile device of claim 1, wherein the instruction further directs the rendering device to exhibit the notification in a picture-in-picture format relative to content being exhibited on the rendering device.

7. The mobile device of claim 1, wherein the instruction further directs the rendering device to exhibit the notification in a scrolling format relative to content being exhibited on the rendering device.

8. The method of claim 1, wherein the notification includes a request for feedback from the user.

9. The method of claim 8, further comprising:
   receiving feedback that has been provided to the rendering device by the user in response to the request, and implementing at least one action in response to the received feedback.

10. A method of providing information to a user of a mobile device, the method comprising:
    receiving an indication of an incoming communication at the mobile device, wherein the indication includes an identifier indicating that the incoming communication is a selected type of a plurality of types of communications, the plurality of types including a phone call and a text message;
    processing the indication to determine that the incoming communication is a selected type of the plurality of types of communications;
    accessing setting information in response to the receipt of the indication of the incoming communication;
    determining that alert information regarding the incoming communication should be transmitted to a rendering device based on the setting information and the determination that the incoming communication is the selected type of the plurality of types of communications; and
    transmitting the alert information regarding the incoming communication from the mobile device to the rendering device, the alert information including an instruction, based on the setting information, for the rendering device to exhibit a notification that notifies the user of the incoming communication and indicates that the incoming communication is of the selected type.

11. The method of claim 10, wherein the incoming communication comprises an incoming phone call or text message from a remote device.

12. The method of claim 10, wherein the incoming communication comprises an email.

13. The method of claim 10, wherein the rendering device comprises an audio/video media rendering device.

14. The method of claim 13, wherein the instruction directs the rendering device to overlay the notification over content being exhibited on the rendering device.

15. The method of claim 13, wherein the instruction directs the rendering device to exhibit the notification in a picture-in-picture format relative to content being exhibited on the rendering device.

16. The method of claim 13, wherein the instruction directs the rendering device to exhibit the notification in a scrolling format relative to content being exhibited on the rendering device.

17. The method of claim 10, wherein the settings information is modifiable by the user.

18. A mobile device operable by a user to receive an incoming communication, the mobile device comprising:
    a processor; and
    a memory unit communicatively connected to the processor and including computer code that when executed controls the mobile device to:
    receive an indication of an incoming communication at the mobile device, wherein the indication includes an identifier indicating that the incoming communication is a selected type of a plurality of types of communications, the plurality of types including a phone call and a text message;
    process the indication to determine that the incoming communication is a selected type of the plurality of types of communications;

access setting information in response to the receipt of the indication of the incoming communication;

determine that alert information regarding the incoming communication should be transmitted to a rendering device based on the setting information and the determination that the incoming communication is the selected type of the plurality of types of communications; and transmit the alert information regarding the incoming communication from the mobile device to the rendering device, the alert information including an instruction for the rendering device to exhibit a notification that notifies the user of the incoming communication and indicates that the incoming communication is of the selected type, the notification including a prompt asking the user if they want to read the incoming communication on the rendering device if the incoming message is a text message.

19. The method of claim 18, wherein the instruction directs the rendering device to overlay the notification over content being exhibited on the rendering device.

20. The method of claim 18, wherein the instruction directs the rendering device to exhibit the notification in a picture-in-picture format relative to content being exhibited on the rendering device.

* * * * *